(12) United States Patent
Todd

(10) Patent No.: US 6,397,128 B1
(45) Date of Patent: May 28, 2002

(54) FLIGHT DATA RECORDER SYSTEM

(75) Inventor: John C. Todd, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/223,592

(22) Filed: Dec. 30, 1998

(51) Int. Cl.$^7$ .............................................. G11B 5/02
(52) U.S. Cl. ......................... 701/14; 701/35; 340/964; 340/971; 340/945
(58) Field of Search ................. 701/14, 1, 24, 701/35; 244/1 R; 340/964, 971, 945; 434/47

(56) References Cited

U.S. PATENT DOCUMENTS

| | | | | |
|---|---|---|---|---|
| 4,656,585 A | * | 4/1987 | Stephenson | 701/14 |
| 4,660,145 A | * | 4/1987 | Hansen | 701/14 |
| 4,682,292 A | * | 7/1987 | Bue et al. | 701/35 |
| 4,729,102 A | * | 3/1988 | Miller, Jr. et al. | 701/14 |
| 4,774,514 A | * | 9/1988 | Hildebrandt et al. | 340/971 |
| 4,970,648 A | * | 11/1990 | Capots | 701/14 |
| 5,053,967 A | * | 10/1991 | Clavelloux et al. | 701/14 |
| 5,500,797 A | * | 3/1996 | Noger | 701/35 |
| 5,508,922 A | * | 4/1996 | Clavelloux et al. | 701/14 |
| 5,710,559 A | * | 1/1998 | Krogmann | 340/963 |
| 5,774,818 A | * | 6/1998 | Pages | 701/3 |
| 5,883,586 A | * | 3/1999 | Tran et al. | 340/945 |
| 5,890,079 A | * | 3/1999 | Levine | 701/14 |
| 5,971,318 A | * | 10/1999 | Lustre | 244/1 R |
| 5,974,349 A | * | 10/1999 | Levine | 701/29 |
| 6,043,756 A | * | 3/2000 | Bateman et al. | 340/945 |
| 6,043,758 A | * | 3/2000 | Snyder, Jr. et al. | 340/970 |
| 6,047,165 A | * | 4/2000 | Wright et al. | 455/66 |
| 6,115,656 A | * | 9/2000 | Sudolsky | 701/35 |
| 6,122,575 A | * | 9/2000 | Schmidt et al. | 701/29 |

* cited by examiner

Primary Examiner—William A. Cuchlinski, Jr.
Assistant Examiner—Olga Hernandez

(57) ABSTRACT

A flight data recording system (50) including a flight data recorder (FDR (12)) with an integrated flight data acquisition unit (FDAU) (16). The FDR (12) has first and second interface ports for communicating with one or more external aircraft instrumentation subsystems. The system includes an digital communication bus (52) coupled to one of the interface ports and arranged to provide a communications pathway between the FDR (12) and the external aircraft instrumentation subsystems. A portable maintenance access terminal (70) is coupled to the system via a local area network bus (60).

7 Claims, 1 Drawing Sheet

FLIGHT DATA RECORDER SYSTEM

TECHNICAL FIELD

The present invention relates generally to aircraft flight data recording (FDR) systems and more particularly to an FDR system with an integrated flight data acquisition unit (FDAU) with improved control and data retrieval functions.

BACKGROUND OF THE INVENTION

Commercial aircraft in the United States are required by the Federal Aviation Administration (FAA) to maintain and provide historical recording of certain flight parameters. The mandated flight parameters, are derived from continuous recording during operational flight of an aircraft and include a minimum number of functional parameters considered essential for reconstructing the aircraft flight profile in post-accident investigation proceedings.

The flight parameters are recorded on a flight data recording system designed to withstand crash environments. The system that is currently in use comprises a flight data recorder (FDR), a flight data acquisition unit (FDAU), a flight data entry panel (FDEP) and, based on the operator, a quick access recorder (QAR). The FDR system typically employs an ARINC 717 bus from the FDAU to the FDR for the purposes of transmitting information. The data recorded by the FDR is sensed by various operating subsystems of the aircraft. The data is acquired and conditioned in the FDAU before being delivered to the FDR for storage. Thus, the FDAU acts as the collecting source for the FDR of mandated flight parameters.

The current generation FDR systems employ an FDAU that is external and adds to the overall weight maintenance and installation cost of the system. In addition, the QAR is separate and, as such, also adds to the overall complexity and weight of the FDR system.

An FDR system that is more compact and provides quick access to recorded flight parameters would be advantageous.

SUMMARY OF INVENTION

The present invention provides a flight data recorder system that removes a number of line replaceable units (LRUs) and provides access to stored data through one or more digital bus interfaces.

According to one embodiment, disclosed is a flight data recording system including a flight data recorder (FDR) with an integrated flight data acquisition unit (FDAU). The FDR has first and second interface ports for communicating with one or more external aircraft instrumentation subsystems. The system includes a digital communication bus coupled to one of the interface ports and arranged to provide a communications pathway between the FDR and the external aircraft instrumentation subsystems. A portable maintenance access terminal is also coupled to the system via a local area network bus or other similar digital data pathway.

The portable maintenance access terminal can include a quick access recorder function similar to those found in present day FDR systems. In particular, the quick access recorder function can be configured to retrieve data from the external aircraft instrumentation subsystems and receive the data from the FDR over the local area network bus. A data table can be included within the portable maintenance access terminal to control various data acquisition functions of the system.

According to another embodiment, disclosed is a system for recording, storing and retrieving flight data parameters. The system includes a first interface to a central maintenance computer and a second interface to a standard ARINC 717 bus interface. The ARINC 717 bus can be coupled to an integrated avionics system including a flight data entry panel (FDEP) function, flight data acquisition unit (FDAU) function, and a quick access recorder (QAR) function that functions in a manner similar to those found in the present day flight data recording systems.

The integrated avionics subsystem can be coupled to a portable maintenance terminal which, in turn, communicates with the central maintenance computer of the system. In this way, data can be stored and retrieved by the user through the central maintenance computer. The ARINC 717 bus provides a signal pathway between the FDR and the integrated avionics subsystem.

BRIEF DESCRIPTION OF THE DRAWING

Other aspects of the invention including specific embodiments are understood by reference to the following detailed description taken in conjunction with the appended drawings in which.

References in the detailed description refer to corresponding numbers and symbols in the figures unless otherwise indicated.

DETAILED DESCRIPTION OF PREFERRED EMBODIMENTS

The present invention provides a flight data recorder (FDR) system that removes a number of the Line Replacement Units (LRUS) found in present day FDR systems and reduces the total weight and costs of the system while at the same time increasing capabilities. The FDR system of the present invention provides the ability to control data storage and retrieving of operation flight parameters. In addition, the FDR system of the present invention allows operator implemented changes to the FDR recorded data through a table uploaded from the portable maintenance access terminal.

Figure 1:
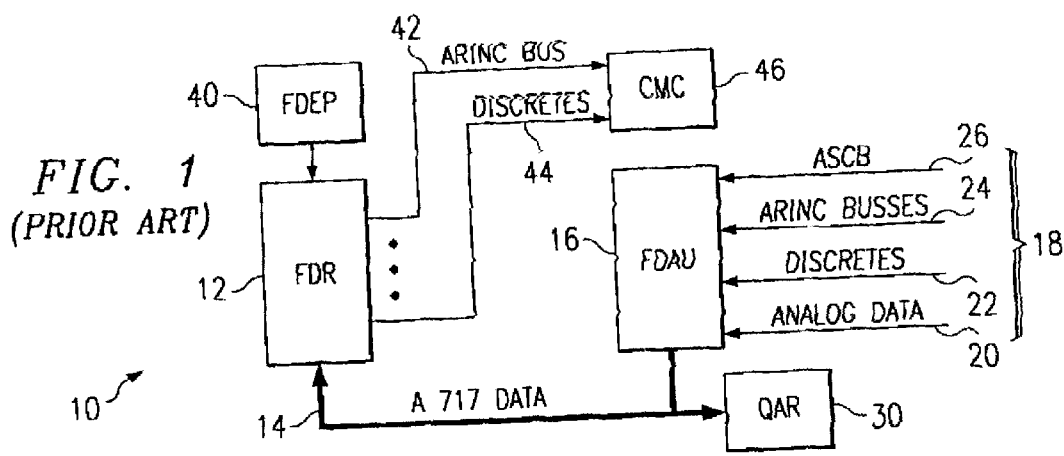
FIG. 1 is block diagram illustrating the architecture a typical prior art flight data recorder (FDR) system.

With reference to FIG. 1 therein is shown a block diagram of the architecture for a prior art FDR system 10. The FDR system 10 includes a flight data recorder 12 which is typically either one or two types: 1. Electrical-mechanical; or 2. Solid state memory. The electrical-mechanical recorders represent the majority used on both civil and military aircraft. The digital signal recorders (solid state or electrical mechanical) represent the contemporary standard for all new aircraft.

This results in the development of high accuracy, fast response engine digital signal sensors which have stimulated requirements for improved flight data monitoring systems. The digital recording signal formats are defined by the ARINC 717 standard, which replaces the ARINC 573 definitions of analog signal formats for implementing the FAA performance specifications for historical recording of flight parameters.

An interface to the FDR 12 is the ARINC 717 data bus 14 which carries nonrecorded flight data after it has been acquired from the various operating subsystems of the aircraft. Next, the data is acquired and conditioned with the flight data acquisition unit (FDAU) 16. As shown, the FDAU has a plurality of signal inputs 18 which are derived from various aircraft instrumentation subsystems such as the auto pilot, airspeed and altitude controllers. Examples of the input 18 include the analog data 20, discreet data 22, ARINC bus data 24 and avionic standard communication bus data 26, among others. The data arriving over inputs 18 from the external aircraft instrumentation subsystems is fed to the FDAU 16 where it is conditioned and converted into a format suitable for the FDR 12.

The FDAU 16 is coupled to the ARINC 717 data bus for communications with the FDR 12 and to the quick access recorder (QAR) 30 as is well known to those of ordinary skill in the avionics industry. Specifically the QAR 30 is responsible for retrieving data that arrives at the FDR 12 over the ARINC 717 data bus 114, and for recording it onto media that the operator can quickly access. The QAR 30 is provided because once the FDR stores data; it may take some time before the data is available to the operator. Typically the QAR 30 is a separate box or subsystem of the FDR system 10, which adds to the overall weight and complexity of the system 10.

Other components of the FDR system 10 include the flight data entry panel 40 which allows the airplane operator to manipulate and control the data retrieved and stored by the FDR 12. In addition, the FDR 12 is interfaced through an ARINC bus and a discreet bus to the central maintenance computer (CMC) 46, which is capable of using the flight data parameters in the FDR 12 to perform various operational and maintenance functions. One function of the CMC 46 is to monitor faults that occur in the FDR 12 and log them for analysis. The CMC 46 can work with the FDR 12 for this purpose.

While the ARINC 717 data bus facilitates communications between the FDR 12, the FDAU 16 and the QAR 30, the fact that all three components are separate within the FDR system 10 adds to the total weight and complexity of the system 10. A FDR system that is more streamlined and less bulky while maintaining the functionality of prior art FDR systems 10 would be advantageous.

Figure 2:
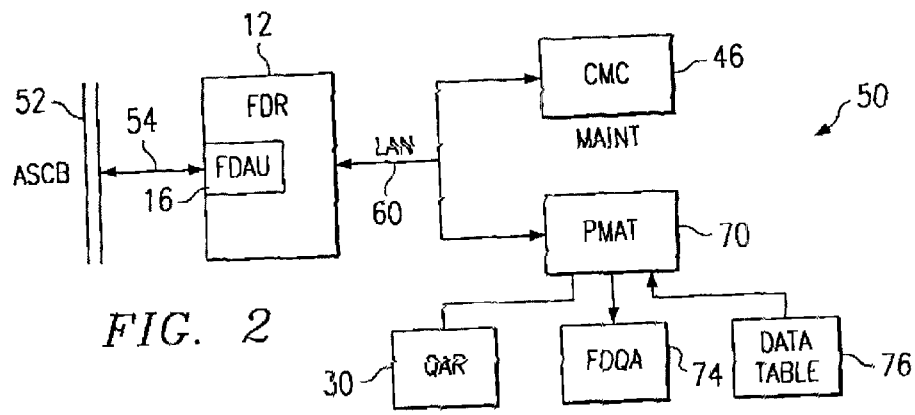
FIG. 2 is a block diagram of an FDR system according to one embodiment of the invention.

With reference to FIG. 2 therein is shown a block diagram for an improved FDR system 50 according to one embodiment of the invention. In essence the FDR system 50 utilizes one or more digital data buses for quick access and retrieval of flight data parameters. Specifically, a digital communication bus 52 and local area network (LAN) bus 60 are provided within the FDR system 50 for data access and storage capabilities herein described.

Another aspect of the invention is that the flight data recorder 12 has an integrated flight data access unit (FDAU) 16 coupled to the digital bus 52 through an interface 54. The interface 54 can be any digital signal pathway that leads to a communications support in the FDR 12 or a similar structure within the FDAU 16.

Since the FDR 12 now contains the FDAU 16 integrated within one unit, the total size and weight of the FDR system 50 is reduced as compared to prior art system 10. The FDR system 50 does not require a separate FDAU 16. It is envisioned that all flight parameters 18 can be communicated to the FDAU 16 through the digital bus 52 over the interface 54. The fact that the FDAU 16 is directly coupled to the digital bus 52 provides a mechanism for access to and retrieval of flight data parameters.

Another aspect of the flight data of the FDR system 50 of the present invention is that the portable maintenance access terminal (PMAT) 70 is provided and communicably coupled to the FDR 12 through LAN bus 60. As shown, the PMAT 70 includes many of the functions of the prior art FDR system 10. For example, PMAT 70 includes a OAR function 30, flight operation quality assurance function 74 and data table 76. The fact that the PMAT 70 has access to functions 30, 74 and 76 allows for operator reconfiguration of the stored information within the data table 76.

Thus, as the Federal Aviation Administration (FAA) expands the requirement for stored FDR information, the FDR system 50 allows the operator to quickly and easily update the FDR recorded data through the data table 76 which can be uploaded via the PMAT 70 and LAN bus 60 to the FDR 12. The fact that the PMAT 70 can communicate with the FDR 12 improves the capabilities of the FDR 12 and reduces the installation costs as well as the weight of the system.

Likewise the central maintenance computer (CMC) 46 can communicate with the FDR 12 over the LAN bus 60. Thus, the functionality of the prior art FDR system 10 is maintained.

Figure 3:
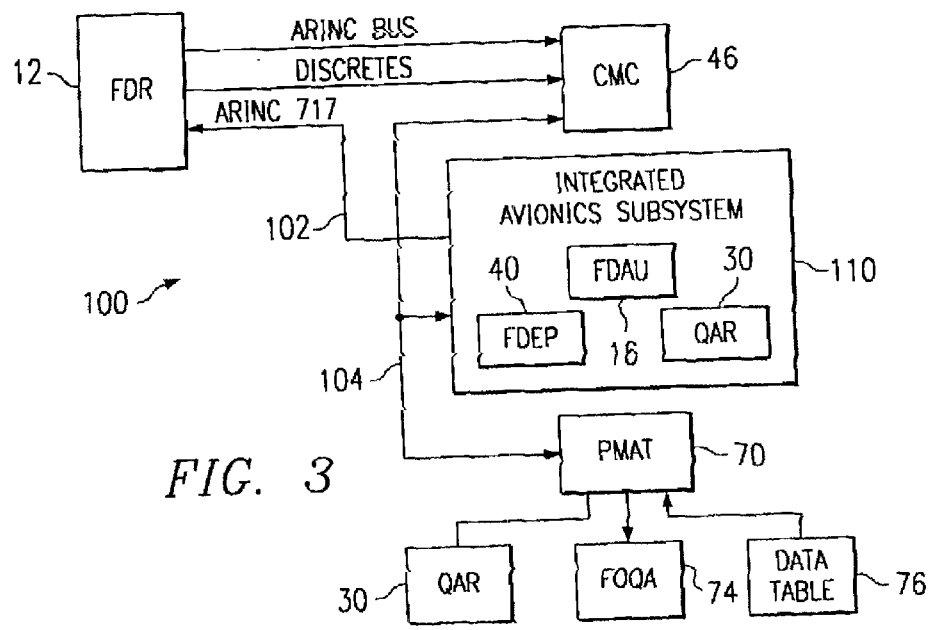
FIG. 3 is a block diagram of an alternative FDR system according to the invention.

With reference to FIG. 3, therein is shown an alternate embodiment of a FDR system 100 according to the invention. The FDR 12 is now coupled to an integrated avionics subsystem 110 which contains the FDEP 40, FDAU 16 and QAR 30 functions. An ARINC 717 bus 102 provides the digital data bus between the FDR 12 and the integrated avionics subsystem 110. In addition, the integrated avionics subsystem 110 is also coupled to the CMC 46 and the PMAT 70 through bus 104 which can be any suitable signal pathway.

The advantage of the FDR system 100 is that it provides a transition between traditional prior art FDR systems 10 which communicate using the ARINC 717 standard and the totally integrated FDR system 50. At the same time, the FDR system 100 dpes mpt reqiore the use of separate FDEP 40, FDAU 16 and QAR 30. In combination with the PMAT 70, the FDR system 100 provides a more compact platform for reading, storing and retrieving flight parameters.

While the invention has been described with respect to specific preferred embodiments, variations and modifications will become apparent to those skilled in the art upon reference to this specification. It is therefore intended that the appended claims be interpreted as broadly as possible in view of prior art to include all such variations and modifications.

What is claimed is:

1. A flight data recording system comprising:
 a flight data recorder (FDR) with an integrated flight data acquisition unit, the FDR having first and second interface ports for communicating with external aircraft instrumentation subsystems;
 an avionics standard communications bus coupled to said second interface port of said FDR and arranged to provide a communications pathway between some of said external aircraft instrumentation subsystems and said FDR,
 wherein one of said external aircraft instrumentation subsystems is a portable maintenance access terminal coupled to said FDR through said local area network bus.

2. The flight data recording system according to claim 2 wherein said portable maintenance access terminated includes a quick access recorder function.

3. The flight data recording system according to claim 2 wherein said quick access recorder function is configured to retrieve data from said external aircraft instrumentation microsystems and deliver it to said FDR over said local area network bus.

4. The flight data record system according to claim 1 wherein said portable maintenance access terminal further includes a data table that controls data acquisition functions of the flight data recording system.

5. The flight data recording system according to claim 1 wherein said portable maintenance access terminal further includes a flight operation quality assurance function.

6. A flight data recording system comprising:

a flight data recorder (FDR) with an integrated flight data acquisition unit, the FDR having first and second interface ports for communicating with external aircraft instrumentation subsystems;

an avionics standard communications bus coupled to said second interface port of said FDR and arranged to provide a communications pathway between some of said external aircraft instrumentation subsystems and said FDR; and a central maintenance computer configured to communicate with said FDR over said local area network bus.

7. The flight data recording system according to claim 1 further comprising a central maintenance computer configured to communicate with said portable maintenance access terminal over said local area network bus.

* * * * *